May 8, 1951     H. W. SCHULZ     2,551,815

MULTIPLE-EFFECT CENTRIFUGATION PROCESS AND APPARATUS

Filed Sept. 25, 1944

LEGEND

1. HOUSING
2. ROTOR
3. HOLLOW SHAFTING
4. TURBINE
5. CONCENTRIC SHAFTING
6. INNER SHAFTING
7. ANNULAR RINGS
8. DISK-LIKE BAFFLES
9. VERTICAL SPACERS
10. AXIAL TUBE
11. FEED EFFECT
12. RADIAL CHANNEL
13. HEATER
14. CONDENSER
15. CONDENSER FINS
16. COLD SURFACE
17. STUFFING BOX

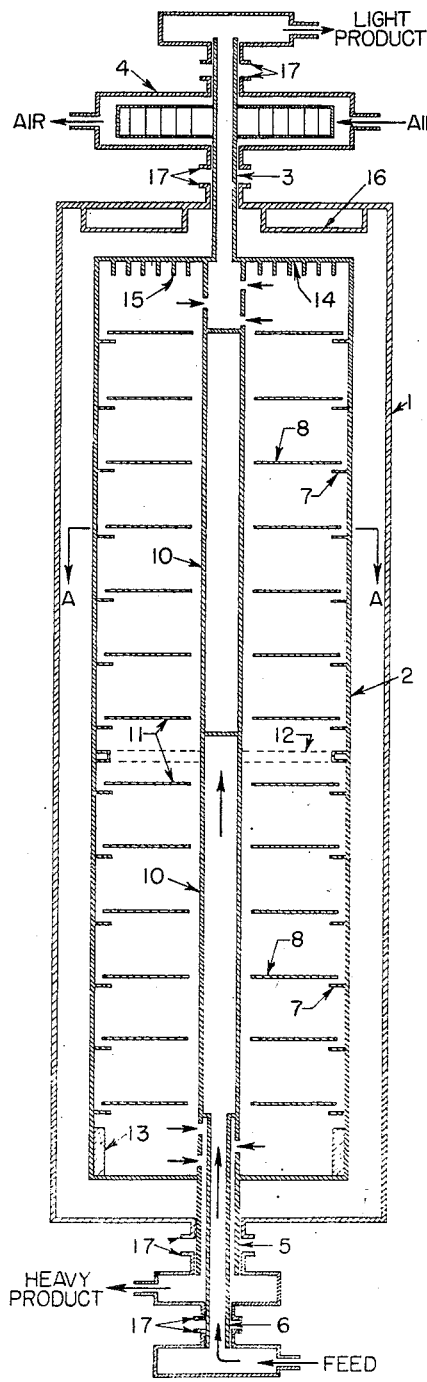

FIGURE 1
VERTICAL SECTIONAL
VIEW OF CENTRIFUGE

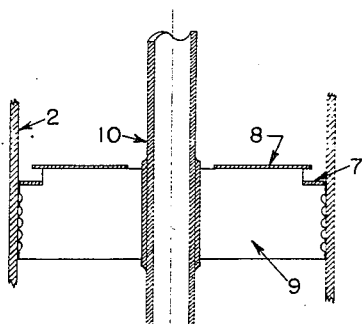

SECTION B-B
FIGURE 2

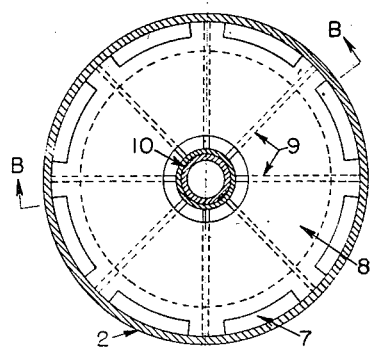

SECTION A-A
FIGURE 3

INVENTOR
BY
ATTORNEY

UNITED STATES PATENT OFFICE 2,551,815

MULTIPLE-EFFECT CENTRIFUGATION PROCESS AND APPARATUS

Helmut W. Schulz, New York, N. Y.

Application September 25, 1942, Serial No. 459,634

4 Claims. (Cl. 233—11)

The subject of this invention is a basic improvement in the art of centrifugations, wherein a number of successive separations are accomplished in a single revolving unit, or in a multiplicity of revolving units. The invention is particularly applicable to an improvement in ultracentrifugation processes and the apparatus for the separation of fluids having small differences in densities and boiling points, such as isopotic modifications of a compound.

The ultracentrifuge, in one of its most useful present embodiments, consists essentially of a revolving vessel containing the fluid mixture to be separated. This vessel is rotated at high speed whereby the fluids are subjected to a high centrifugal field of force, which tends to concentrate the denser fraction of the fluid at the periphery of the vessel, and the lighter fraction at the axis, with material of intermediate composition distributed according to a density gradient. The fluid to be separated may consist either of a liquid, vapor, or gas, or a combination of these. The revolving vessel may be supported by an air bearing or by suspension in a magnetic field. The cylinder may be driven by means of a flexible shafting connected to an air turbine or to a highspeed synchronous motor. Customarily, this shafting is hollow to permit introduction or removal of fluid from the vessel. Suitable ducts to remove fluid from the periphery of the vessel are provided and are connected to the shafting intended for the removal of heavy fractions. The lighter fraction is removed from the axis of the vessel through a suitable shafting.

The rotating vessel is generally surrounded by a housing fitted with bearings through which the flexible shafting extends. The housing may be evacuated or filled with an inert gas at reduced pressure. The housing also may provide a means for temperature control within the vessel.

Whatever may be the mechanical form of presently known ultra-centrifuges, they are subject to definite limitations. The degree of separation in each operation is a function of the density difference between the fluids, the peripheral speed of the centrifuge, and the temperature. This degree of separation is termed unit separation factor and represents the maximum separation obtainable for a given density difference, speed of rotation, and temperature. As expressed mathematically for a two component mixture, it represents the ratio of the concentration of the light component at the axis to the concentration of light component at the periphery. The unit separation factor for a gas or a vapor may be computed by the following theoretical equation:

$$A = e^{\left[\frac{(M_2-M_1)V^2}{2RT}\right]}$$

where $M_2$ and $M_1$ represent the molecular weights of the substances, $V$ = peripheral speed
$R$ = gas constant
$T$ = absolute temperature.

In the present method of centrifugation, the degree of separation in a single centrifugation is limited to the unit separation factor, as defined above. In cases where the unit separation factor is inherently small, as in the separation of isotopic modifications of a compound, a large number of centrifugations must be carried out to effect a substantial enrichment of the desired component. Thus for a unit separation factor of 1.04, it would require approximately 50 successive centrifugations to increase the concentration of a desired component from one per cent to seven per cent. Since for practical reasons it may be expedient to separate each charge into two equal fractions, the amount of material available for each successive centrifugation is one-half that employed in the previous centrifugation. Thus, in the example given above, to obtain even one miligram of the desired 7 per cent material, it would be necessary to start with wholly prohibitive quantities of the 1 per cent material, or perform a wholly prohibitive number of individual centrifugations in exhaustive reprocessing of intermediate products.

Thus, presently known centrifugation processes are wholly inapplicable for separating material of extremely small differences in density. For instance, the separation of the compounds of uranium[235] from those of uranium[238] is a matter of economic and military significance, because uranium[235] is a potential source of atomic energy. However, the unit separation factor of uranium[235] hexafluoride from uranium[238] hexafluoride is of the order of 1.04, under practical conditions of temperature and peripheral speed, so that its separation by present centrifugation methods is quite impractical, as indicated above.

This invention provides a method of centrifugation, whereby a multiple effect separation is obtained by continuously passing material through a series of centrifugation effects, unit separation factor being approximated in each effect; the lighter fraction removed in each effect being passed continuously to a succeeding effect richer in a lighter component, and the heavier fraction removed in each effect likewise being passed continuously to a preceding effect richer in a heavier component. In particular, the invention provides for the operation of a two-phase system for the purpose of accomplishing the transfer of material from one effect to an adjoining effect. In this manner, depending on the number of effects involved, a high degree of separation may be obtained without handling prohibitive quantities of materials, or performing a prohibitive number of centrifugations. The invention particularly relates to an apparatus for accomplishing multiple effect centrifugation within a single revolving unit. The invention as applied to an appropriate system will now be more particularly discussed, but the process of this invention is not limited to the particular apparatus described.

This apparatus is designed to separate a condensible vapor, both liquid and gas phases being present. The light component separated in each effect passes as a vapor to the succeeding effect, and the heavier component separated in each effect passes as a liquid to the preceding effect.

The schematic construction of a suitable apparatus is shown in Figures 1, 2 and 3. Figure 1 shows a vertical sectional view of the centrifuge, and Figures 2 and 3 represent vertical and horizontal sections of a single centrifugation effect. The centrifuge consists of a housing 1 in which is suspended the rotor or spinning chamber 2. This rotor is driven by means of a flexible, hollow shafting 3 connected to a turbine 4. The fluid to be separated is fed through the center tube 6 of concentric shafting 5, which serves to position the rotor 2, but need not be constructed as a thrust bearing, since the rotor is preferably suspended in the housing as previously discussed. The light product is removed through the hollow shafting 3 and the heavy product through the annular space of concentric shafting 5.

The interior construction of the rotor 2 is an important feature of the apparatus. The rotor is divided into a number of horizontal compartments, termed effects, by means of annular rings 7 and disk-like baffles 8. These rings and baffles are supported, spaced and positioned by means of vertical spacers 9 which divide each effect into sector-shaped compartments by means of radially disposed vertical walls.

The annular rings 7 fit tightly against the wall of the revolving cylinder and when the centrifuge is in operation constitute a dam against the passage of the liquid phase along the periphery of the centrifuge, except by overflowing the circular barriers. These rings have a uniform inside diameter equal to the diameter of the liquid-gas interface it is desired to maintain during operation. In other words, the height of the circular dam in the radial direction is equal to the thickness of the liquid film spread along the wall of the cylinder by centrifugal action. In general, it will be desirable to maintain the thickness of the liquid film at a minimum in order to reduce the liquid hold-up of the system.

The disk-like baffles 8 are placed slightly above each circular ring and protrude into the liquid phase during operation in such a manner that the liquid affords an effective seal against the passage of vapor from one effect to the next along the liquid-gas interface, while at the same time permitting the flow of liquid past the baffle along the wall of the cylinder. This means that the outside edge of the disk should extend approximately half-way into the liquid film, except that it may extend to the wall of the cylinder at regular intervals for positioning and structural support, as indicated in Figure 3. Each baffle is provided with a small concentric hole through which the vapor may pass from one effect to the next. This system of rings and baffles restricts the passage of fluid between the effects thus created to the movement of liquid along the interface solely by overflowing the dams, and the movement of vapor solely along the axis of the revolving vessel.

The vertical spacers 9 consist of vertical walls which extend radially from a small concentric cylinder to which they are attached, to the periphery of the rotor, thereby dividing each horizontal effect into a number of sector-shaped compartments. The supporting cylinder of each spacer fits snugly around a small hollow tube 10, which extends along the axis of the centrifuge from end to end. The height of the vertical spacers may be determined by the number of effects it is desired to provide for a given length of centrifuge. In general, the smaller the height per effect, the greater the number of effects, but the smaller the output of product for a given centrifuge. The spacers serve to support the rings and baffles, as indicated in the diagram. The concentric openings in the baffles may be larger in diameter than the outside diameter of the supporting cylinders of the spacers to provide a passage for the vapors from effect to effect.

The radial walls of the vertical spacers that divide each horizontal effect into sector-shaped compartments serve the additional purpose of counteracting the undesirable acquisition of angular acceleration by a molecule moving in a radial direction.

A feature of the above arrangement of rings, baffles and spacers is that it admits readily of a piece by piece assembling of the interior structure of the centrifuge, and, more particularly, that the number and capacity of the single effects can be readily changed by using spacers of different heights. The rings, baffles and spacers must be of symmetrical design and careful construction to balance weight distribution about the axis. If preferred, the interior assembly may of course be constructed as a rigid unit. The material of construction should be selected to withstand the stresses imposed and the corrosive action of the fluid to be processed.

The hollow axial shaft 10 serves as a channel for the introduction of feed to the particular effect 11 where the concentration of the components is the same as that of the feed, marking the transition from enriching to exhausting effects. The hollow section of tube 10 connects with radial channels 12 incorporated into the radial walls of the spacer of the feed effect, so that the feed may be introduced at a point near the gas-liquid interface.

At the bottom of the rotor is provided an annular heating element 13 adjacent to the wall of the rotor, which is heated by induced electrical current or in some other manner. Alternatively, heat may be radiated from the housing to the rotor at this lower part. The function of the heat input is to vaporize all liquid overflowing the annular ring next above the heated section.

At the top of the rotor there is provided a condenser 14, which accomplishes the removal of heat from the top of the rotor. The condenser may have fins 15 in order to provide additional condensation surface. The heat is conducted through the fins 15 through the top plate of the rotor and radiated from there to a cold surface 16 mounted in the top of the housing. The temperature of the cold surface may be maintained by refluxing a low-boiling liquid under constant pressure within a chamber in contact with surface 16. However, other means of cooling this surface may be provided. Stuffing boxes 17 are provided as shown to afford necessary seals between stationary members and the revolving shafting.

The apparatus just described is adapted for the separation of two or more fluids having the same or different boiling points but differing in densities. The fluid is introduced in the form of a vapor, and the temperature within the rotor is maintained at or about the boiling point of the fluid mixture under the pressure maintained at the gas-liquid interface. As a consequence, both a liquid and a gas phase in equilibrium with each other are present in each effect throughout the rotor. In operation, the liquid phase will be concentrated along the wall of the rotor by means of centrifugal force, whereas by the same means, the gas phase will be distributed radially along a decreasing density gradient to the center of the rotor, with the lightest fraction at the center.

The system of rings, baffles and spacers just described will cause the rotor to be divided into effects wherein the liquid phase of one effect will be prevented from mixing with the liquid phase of another effect by means of the rings 7. Similarly, the vapor phase of one effect may pass to the next effect only through the circular opening in the center of each baffle, because of the liquid seal provided between the rings and baffles at the periphery.

In one method of operation, the feed will be introduced as a gas into an effect near the middle of the rotor, wherein it passes through the channels 12 in the vertical spacer to a point near the liquid-vapor interface. As a consequence of centrifugal action, the less dense fraction will tend to be concentrated as a gas at the center, whereas the heavier fraction will gravitate to the gas-liquid interface. Here, a part of the heavier components in the vapor phase will condense and in so doing vaporize an equivalent amount of the lighter components from the liquid phase tending to establish vapor-liquid equilibrium at the interface. This equilibrium is continuously disturbed in each effect both by the influx of vapor richer in a lighter component from the next lower effect in the series and by the overflow of liquid richer in a heavier component from the next higher effect in the series, as subsequently described. The flow of feed is adjusted to the capacity of the centrifuge so that approximate conditions of equilibrium exist in each effect. The lighter vapor will be continuously separated and displaced from the middle effect to the next higher effect. In that effect it will be separated into a light and heavy fraction as in the preceding effect. Thus, the vapor passing up through the passages at the center of the rotor will become progressively enriched in the lighter fraction. When the vapor reaches the top effect, part will be removed as light product by means of a vacuum pump, and part will be condensed and returned as reflux. The condensation of part of the vapor in the top effect will create a partial vacuum at the top of the rotor which will draw the vapor column continuously up the central passage. In the course of the upward flow of vapor from effect to effect, the heavier molecules will be continuously replaced by lighter molecules as a consequence of the centrifugal separation achieved in each effect.

The liquid condensed at the top of the rotor is termed the reflux and will be immediately thrown to the periphery of the rotor, where it will cause an overflow of liquid across the annular ring separating this effect from the one immediately below it. This is repeated from effect to effect so that the liquid passing downward along the periphery will be enriched in a heavier fraction. By constructing the baffles so that they extend nearly to the walls of the rotor, the liquid displaced from each effect will tend to be the heaviest fraction existing in that effect. In the particular embodiment of the invention described, the effects below the feed effect will serve as an exhausting section to concentrate the heavier fraction of the feed, while those above the feed plate will serve as an enriching section to concentrate the lighter fraction of the feed. In the bottom effect, all the liquid is vaporized, a part thereof to be withdrawn as heavy product and the remainder to be recycled as "reboil" through the cycle described.

The above description has reference to operation with both enriching and exhausting sections in the centrifuge, but it is understood the feed could be introduced either at the top or bottom, and the centrifuge serve either as an exhausting or enriching column. The form of the rotor need not necessarily be cylindrical, but could for example be in the form of a truncated cone, and such an arrangement could accommodate a variable reflux ratio between effects by providing partial condensation in the effects.

For a given unit separation factor, the degree of separation will depend upon the number of effects provided and upon the reflux ratio employed. At total reflux, the over-all enrichment will be approximately the unit separation factor raised to a power corresponding to the number of effects, or, $$\frac{X_p}{X_f} = A^N$$

where $X_p$ = concentration of desired component in product
$X_f$ = concentration of desired component in feed
$A$ = unit separation factor, and
$N$ = number of effects In operating the centrifuge, the proper ratio between the withdrawal rates of both light and heavy products may be maintained by selecting the cross-sections of the respective exit shafts in that ratio, and maintaining identical pressures in both the light and heavy product receivers. The amount of feed may similarly be controlled by bleeding it into an intermediate low-pressure chamber maintained at a calculated pressure, from which the centrifuge will withdraw an amount automatically equal to the sum of the light and heavy product by the differential pressures created. The magnitude of the receiver pressures together with the rotational speed of the tube will determine the pressure at the gas-liquid interface, and thus the temperature at which the system must be maintained in order to have the liquid at its boiling point.

The ratio of the fraction returned to the system as reflux to the fraction withdrawn as light product, known as the reflux ratio, has a minimum value known as the minimum reflux ratio, as fixed by the requirement of a material balance under steady state operation. The minimum reflux ratio is a function of the unit separation factor and of the ratio of the desired concentration of light component in the product to the concentration of light component in the feed, and is given by the equation:

$$L = \frac{\frac{X_p}{X_f} - A}{A - 1}$$

where
L = minimum reflux ratio
$X_p$ = concentration of desired component in light product
$X_f$ = concentration of desired component in feed
A = unit separation factor.

In practice it is desirable to use a reflux ratio greater than the theoretical minimum in order to obtain a greater over-all separation for a given number of effects. However, the production capacity of the system is correspondingly decreased until under total reflux no product can be removed.

The following operating conditions are recommended for the separation of $U^{235}F_6$ and $U^{238}F_6$, assuming that it be desired to concentrate $U^{235}F_6$ from a concentration of 0.71% in the feed to a concentration of 5% in the product. The temperature of operation is 70° C., the peripheral speed is 27,000 cm./sec., and the unit separation factor is 1.039. Under these conditions, the minimum reflux ratio is 154 to 1, and the number of theoretical effects required in the enriching section when operating under total reflux is 50.

Feasible dimensions for the rotor of the centrifuge are a length of six feet and a diameter of four inches, if operation is intended on a laboratory scale.

It is to be understood that the attached drawings are schematic to illustrate the principle of the invention since the general construction of the ultracentrifuge with its necessary bearings and shafts for introducing and withdrawing products have already been described in the literature.

I claim:

1. Process for separating or concentrating in the presence of both liquid and vapor phases a mixture of fluids of different densities and substantially the same volatilities, which comprises successively subjecting said fluids to a multiplicity of independent centrifugation effects, wherein the liquid phase is centrifugally concentrated in a layer having a contour determined by the rotation of a symmetrical geometrical figure about its axis of symmetry, the centrifugal force in each effect being sufficient to distribute the components of the vapor phase along a density gradient from the axis of rotation to said layer, causing a fraction richer in heavier component to condense in said layer in each effect, causing the liquid phase to flow from effect to effect in the direction of an increasing concentration of heavier component, causing the vapor phase to flow from effect to effect in the direction of an increasing concentration of lighter component along a path surrounding and including said axis of rotation, maintaining the temperature in each effect substantially the same as the boiling point of the fluid mixture under the pressure maintained at the vapor-liquid interface, supplying heat to an effect having the highest concentration of heavier component and vaporizing at least some of the liquid phase present therein, and removing heat from an effect having the highest concentration of lighter component, and condensing at least some of the vapor phase present therein, the amounts of heat supplied and withdrawn being sufficient to cause said liquid and vapor phases to flow from effect to effect in the directions stated.

2. Process as claimed in claim 1 in which the fluid mixture to be separated or concentrated is continuously introduced as feed to an effect having a concentration of components similar to that of the feed, and in which products are continuously withdrawn, the product enriched in a lighter component being withdrawn from an effect disposed from the feed effect in the direction of increasing concentration of lighter component, the product enriched in a heavier component being withdrawn from an effect disposed from the feed effect in the direction of increasing concentration of heavier component.

3. An ultracentrifuge in which mixtures of fluids are separated or concentrated in the presence of both their liquid and vapor phases comprising a rotor supported for rotation about a vertical axis in a housing, said rotor being divided into multiplicity of sections by means of rings and circular shaped baffles; said rings being fitted against the wall of the rotor and said baffles extending past the inner circumference of said rings but not to the wall of the rotor throughout their entire corcumference, thus effecting a liquid seal along the wall of the rotor in cooperation with liquid held against the wall by the rotation of the rotor, the baffles having an opening radially disposed from the axis of the rotor to permit separated lighter vapor to pass from section to section, said ultracentrifuge being equipped with means for withdrawing heat near the top of the rotor, means for introducing heat near the bottom of the rotor, and means for introducing and withdrawing fluid to and from the rotor.

4. An ultracentrifuge in which mixtures of fluids are separated or concentrated in the presence of both their liquid and vapor phases comprising a cylindrical rotor supported for rotation about a vertical axis in a housing, means for driving said rotor at peripheral speeds operative to concentrate the liquid phase on the wall of said rotor and the vapor phase along a density gradient from the axis of the rotor, said rotor having centrally located hollow shafting for introducing and withdrawing fluid to and from the rotor, and being divided into sections by means of removable horizontal discs fitted around said shafting through a concentric opening and extending at spaced intervals to the wall of the rotor, said discs having a plurality of circumferential openings, and said concentric opening to permit separated lighter vapor to pass from section to section, and, in conjunction with said discs, solid rings fitted against the wall of the rotor and having an inner circumference closer to the axis than said circumferential openings, said ultracentrifuge containing cooling means at the top of the rotor for condensing vapor as reflux in said rotor, and heating means at the bottom of the rotor for evaporating liquid in said rotor.

HELMUT W. SCHULZ.

(References on following page)

REFERENCES CITED

The following references are of record in the file of this patent:

UNITED STATES PATENTS

| Number | Name | Date |
|---|---|---|
| 450,391 | Wahlin | Apr. 14, 1891 |
| 566,807 | Simonds | Sept. 1, 1896 |
| 783,045 | Johnson | Feb. 2, 1905 |
| 1,061,656 | Black | May 13, 1913 |
| 1,700,923 | Fawkes | Feb. 5, 1929 |
| 2,003,308 | Podbielniak | June 4, 1935 |
| 2,004,011 | Podbielniak | June 4, 1935 |
| 2,105,217 | Kelling | Jan. 11, 1938 |
| 2,170,071 | Furrer | Aug. 22, 1939 |
| 2,333,712 | Eckey | Nov. 9, 1943 |

OTHER REFERENCES

Mulliken: "Separation of Isotopes by Diffusion," Journal of the American Chemical Society, vol. 44, pages 1033–1051 (pages 1036–1044, 1049, 1050 cited). (May 1922.)

Beams et al.: "Concentration of Isotopes by the Evaporative Centrifuge Method," Physical Review, vol. 56, pages 266–272. (August 1, 1939.)

Humphreys: "Separation of Bromine Isotopes by Centrifugation," Physical Review, vol. 56, pages 684–691. (Oct. 1, 1939.)

Randall et al.: 32 Industrial and Engineering Chemistry, 125–129. (Jan. 1940.)

Smyth: "Atomic Energy for Military Purposes," published August 1945, by U. S. Government Printing Office, Washington, D. C. pages 117 and 122.